(12) United States Patent
Birkenhauer et al.

(10) Patent No.: US 7,353,237 B2
(45) Date of Patent: Apr. 1, 2008

(54) COMPUTER SYSTEMS, METHODS AND PROGRAMS FOR PROVIDING UNIFORM ACCESS TO CONFIGURABLE OBJECTS DERIVED FROM DISPARATE SOURCES

(75) Inventors: Christoph Birkenhauer, Wiesloch (DE); Dietmar Nowotny, Dielheim (DE); Udo Laub, Hambrucken (DE); Gunther Liebich, Walldorf (DE)

(73) Assignee: SAP AG, Waldorf (DE)

( * ) Notice: Subject to any disclaimer, the term of this patent is extended or adjusted under 35 U.S.C. 154(b) by 394 days.

(21) Appl. No.: 11/097,155

(22) Filed: Apr. 4, 2005

(65) Prior Publication Data

US 2005/0234980 A1    Oct. 20, 2005

(30) Foreign Application Priority Data

Apr. 5, 2004    (EP) .................. 04008197

(51) Int. Cl.
*G06F 17/00* (2006.01)
(52) U.S. Cl. .................................. 707/103 R
(58) Field of Classification Search .......... 707/4, 707/102, 103 R, 103 Y, 103 X, 103 Z; 709/310–320
See application file for complete search history.

(56) References Cited

U.S. PATENT DOCUMENTS 5,905,987 A    5/1999  Shutt et al.
6,418,451 B1   7/2002  Maimone 2001/0018689 A1    8/2001  Spence et al.

FOREIGN PATENT DOCUMENTS

WO    WO 99/13419 A1    3/1999

OTHER PUBLICATIONS

EPO Communication and Search Report, dated Dec. 16, 2004 (10 pages).
"The Enterprise Objects Framework," Enterprise Objects Framework; Building Reusable Business Objects, Jul. 1994, pp. 1-12.
PCT Search Report, dated Jun. 24, 2005 (8 pages).
Notification and International Preliminary Report on Patentability, mailed on Oct. 11, 2006 (9 pages).

*Primary Examiner*—Chong H Kim
(74) *Attorney, Agent, or Firm*—Finnegan, Henderson, Farabow, Garrett & Dunner, L.L.P.

(57) ABSTRACT

Embodiments of the present invention relate to computer systems, methods and programs for storing a set of data obtained from a data source, the set of data comprising a set of attribute or field names and respective attribute or field values. The computer system may comprise means for storing object type definitions, each object type definition comprising an object type name and at least a set of defining characteristics and a set of role names, and means for storing role definitions, each role definition comprising a role name and at least a set of controlling characteristics. Further, the computer system may include means for storing a list of prioritized finding rules, each finding rule comprising a condition for application to values of the set of data and one of the object types that is returned when the condition is fulfilled, means for storing objects that are instances of the object types, and means for storing mass data referring to objects; and a set of inbound interfaces.

13 Claims, 6 Drawing Sheets

COMPUTER SYSTEMS, METHODS AND PROGRAMS FOR PROVIDING UNIFORM ACCESS TO CONFIGURABLE OBJECTS DERIVED FROM DISPARATE SOURCES

TECHNICAL FIELD

The present invention generally relates to data processing and storage systems. More particularly, embodiments of the invention relate to computer systems methods and programs for configuring and storing sets of characteristics derived from a plurality of data sources in an object oriented environment.

BACKGROUND INFORMATION

Modern database management systems are powerful tools used for organization, retrieval, and storage of information used by a countless number of applications, including various commercial, industrial, technical, scientific, and educational applications. However, database management systems do not release the application developer from giving plenty of thought to the integration of application programs trying to retrieve data and data sources providing that data. A complex environment consisting of a variety of such applications and a plurality of different data sources makes it difficult to design a successful end-to-end solution that efficiently allows application programs to uniformly access data from those sources.

Object-oriented software technology can be in general defined as the use of objects as the building blocks of applications. Objects are independent program modules written in object-oriented programming languages which are designed to work together at run time. In object-oriented application development, it is often advantageous to store an object's current state into a permanent storage medium, in order to release software and hardware resources used by such an object. When the object is later needed, it may then be retrieved from the place where it is stored. The storage of objects into a permanent storage medium is generally referred to as persistence.

Unfortunately, the majority of business applications used in conventional computer systems require to know and depend on the complete structures and database schemata of the objects to be processed. Enabling the business applications to process new types of objects entails development at considerable expenditure of resources. Changing object attributes by the end-user such that the changes reflect in the business applications constitutes a very difficult and costly process—if possible at all—since not only the objects themselves need to be changed, but also the applications using it.

Accordingly, there is a need for systems and methods that provide an abstract object view to the application programs and that do not stand in the way of openness and flexibility. The knowledge of concrete objects must be taken out of the business applications and centralized in a separate software component. That software component takes responsibility for defining, enhancing, displaying, storing and accessing objects.

SUMMARY

According to one embodiment consistent with the present invention, there is provided a software layer that allows a plurality of applications to access and process different types of objects in a uniform manner whose exact structures and data types are not known at the time of software development. The objects are derived from sets of data coming from various data sources that may be aware or unaware of an application. The possibility of configuration by the end-user avoids wasting of valuable resources on the costly changes of inflexible systems.

Embodiments consistent with the present invention can be used as part of a software system comprising a number of application programs that perform functions for a variety of objects. Embodiments of the invention may provide a solution where the applications can program against a fixed interface and fixed data types. The application programs are not bothered with the complexities of flexible object structures and need not know how to retrieve the desired object information from different data sources. Rather, the application programs make specific demands on some of the properties of an object which ensure that a function can be executed for an object. For example the value of a property of a particular object might indicate what kind of calculation needs to be performed for this object. During run time, the application programs only access those properties, whose data formats were fixed at development time.

The final structure of a set of objects is defined by configuring object types. The configuration of object types also defines how an object may be derived from a set of data and how an object is presented in the user interface. Existing object types can be enhanced and new object types can be introduced freely without the need of changing the application programs. Therefore, adjustments by the end-user can be facilitated. If an end-user needs an additional attribute for certain objects, he/she can specify it exactly once per object type. This attribute can then be available automatically in all the places where those object types are used.

Embodiments of the present invention may act as a mediator between the data sources and the user interface on one side and the application programs on the other side. From an application program's point of view, it connects the "outside world" to the static object view of the application program. Every object is identified by two kinds of keys. An internal, technical key identifies all objects uniquely across all object types. Its data format is the same for all object types. Application programs work with this technical key. Putting it into application-specific database tables allows fixing the database schema at development time. However, the technical key cannot be used to identify an object when communicating with the outside world. Therefore, an external business key takes over the vocabulary of the underlying sets of data. It is used to derive an object from a set of data and to present an object in the user interface. Its data format is object-type specific. All database tables using the external key have to be created after the configuration of an object type.

Additional objects and advantages of embodiments consistent with the invention will be set forth in part in the description which follows, and in part will be obvious from the description, or may be learned by practice of embodiments of the invention. The objects and advantages of embodiments of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles consistent with the present invention.

In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Figure 1:
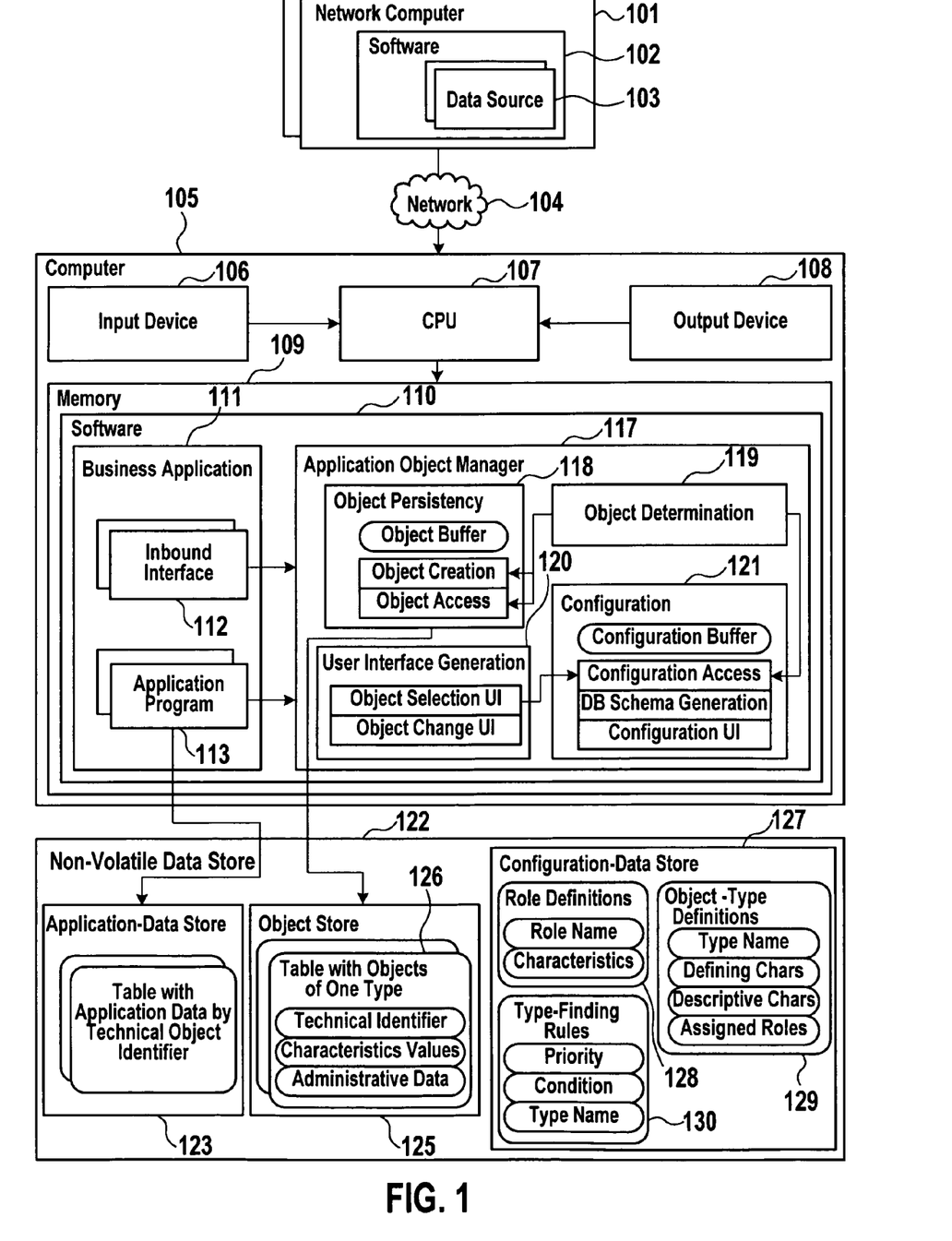
FIG. 1 illustrates an exemplary computer system suitable for executing processes consistent with embodiments of the present invention.

FIG. 1 illustrates an exemplary computer system, consistent with an embodiment of the present invention. Square rectangles are used to structure system components and program modules, rounded rectangles represent volatile or non-volatile data. The lines connecting rectangles indicate the direction of request, i.e., which component uses another component.

Computer 105 has an input device 106, a CPU 107, an output device 108, and a memory 109. Computer 105 may be connected to one or more computers 101 via network 104. Furthermore, computer 105 has access to a non-volatile data store 122. Data store 122 may be administered by a database management system running on computer 105 or running on one of the network computers 101. Software 110 is loaded into memory 109 for execution by CPU 107. Software 110 comprises business application 111 and application object manager 117.

Program modules 112 and 113 of business application 111 make use of the program modules of application object manager 117 and exchange data with application-data store 123. Application object manager 117 consists of the program modules 118, 119, 120, and 121. Program module 118 provides an interface to create, change, and retrieve objects. In addition, module 118 buffers objects from object store 125 to allow faster access. Program module 121 takes care of the configuration of application object manager 117. It provides an interface to maintain configuration and buffers configuration data from configuration-data store 127. Application-data store 123, object store 125 and configuration-data store 127 are contained in non-volatile data store 122.

Configuration-data store 127 holds role definitions 128, object-type definitions 129, and type-object type finding rules 130. The configuration is maintained by the end-user via input device 106 or any input device of one of the network computers 101 using the configuration user interface of program module 121. The configuration user interface is displayed on output device 108 or on any output device of one of the network computers 101.

A role definition comprises of a role name and a set of characteristics. A characteristic is a property for describing and distinguishing between objects, such as material number, material group or color. Each characteristic has a number of permitted values. A role stipulates a set of characteristics that are contained in an object in order that an application program 113 can process the object. Thus, a role serves as an abstraction from individual objects. All objects meeting the requirements of a role can be treated the same by an application program, no matter what the individual object exactly looks like. The semantics of an object for the purposes of an application program is sufficiently described by the role, disregarding additional, yet irrelevant properties.

Object types describe objects that have the same characteristics. In one embodiment, a type definition may lay down the following properties:

What are the defining characteristics of an object?
Defining characteristics state how an object is unambiguously identified. For example, a product stored in the warehouse of a plant might be identified by the combination of product number, plant number, and warehouse number. Defining characteristics may serve as a key for database access in order to retrieve an object.

What are the descriptive characteristics of an object?
Descriptive characteristics provide further information about an object (e.g., product group). For two different objects, the values of the descriptive characteristics may be the same, while one of the values of the defining characteristics always differs.

What characteristics need to be supplied when creating a new object?
Some characteristics must be passed to the interface when creating a new object, while other characteristics might be derived automatically by providing default rules.

Which roles are implemented by the object type?
An object type is assigned one or more roles. A role may be assigned to more than one type. All characteristics of the role(s) are added to the type definition and must be categorized according to the above criteria. By assigning a role to an object type the set of characteristics associated with that role is guaranteed for all objects of this type.

When the configuration of an object type is activated, the corresponding database table 126 is created by the DB schema generation of software module 121.

Usually, there are several object-type definitions in parallel. Therefore, configuration-data store 127 holds a set of type-object type finding rules 130 which are used by program module 119 when determining an object from an arbitrary set of data. Type-object type finding rules define conditions about characteristic values that are processed in a certain order. If a condition evaluates to true, the corresponding type is returned. For example, a condition may state that object type TV is returned if the value of the characteristic "plant number" is between 100 or 300.

In operation, inbound interface 112 receives a set of data from one of the data sources 103 running on a network computer 101 or from the end-user via input device 106. Data sources may also run on computer 105. Data sources do not know about objects and object types which are a local concept of software 110. Yet inbound interface 112 knows about the concept of objects and roles that are used by the related application programs 113. It sends the set of data or a subset together with a role to program module 119 to obtain the object affected by it. Afterwards it writes a reference to the object into application-data store 123 together with other data derived from the received set of data.

Figure 2:
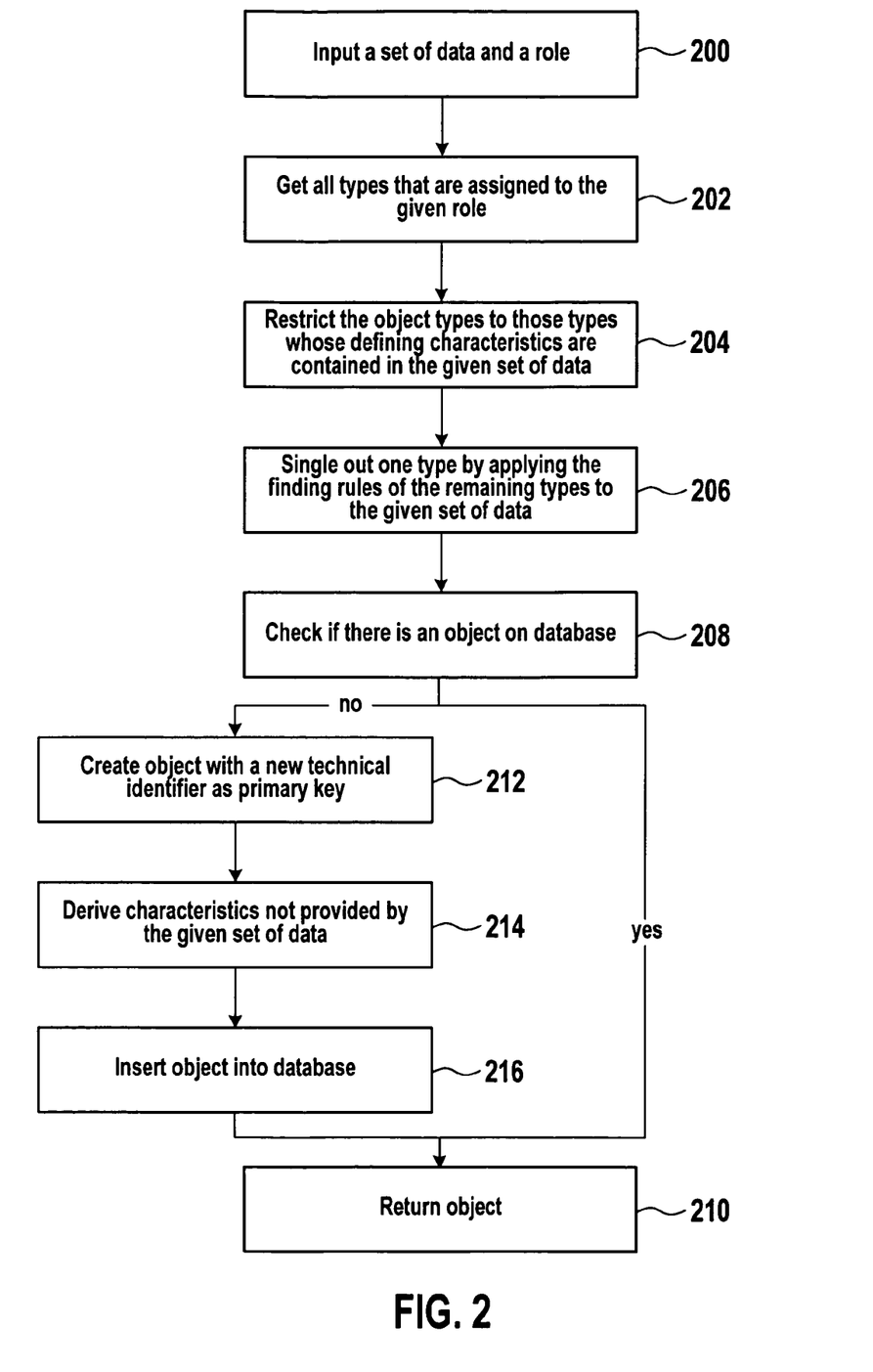
FIG. 2 is a flowchart describing an exemplary process, consistent with an embodiment of the present invention.

FIG. 2 illustrates a flowchart of an exemplary method for describing, by way of example, how an object may be determined from a set of data in a computer system, such as that illustrated in FIG. 1. The set of data is passed together with a role to program module 119 (step 200). First, it requests all object types from program module 121 that are assigned to the given role (step 202). Then, it narrows down the set of candidate object types by removing all object types whose defining characteristics are not provided by the set of data (step 204). Afterwards, the object-type finding rules associated with the remaining candidate object types are processed in the configured order (step 206). The object type associated with the first rule whose condition is met is returned. If no object type could be determined, an error is returned.

Once the object type is known, the actual object needs to be determined. First, program module 118 is asked to check if the database table with all the objects of the determined type contains an object for the given defining characteristics (step 208). If an object is found, it is returned (step 210). Otherwise, program module 118 is asked to create a new object (step 212). The object is assigned a unique technical identifier. All characteristics not passed by the calling program module are derived (step 214). If mandatory characteristics have not been passed, an error will be output. Otherwise, the object is written to object store 125 (step 216) and finally returned (step 210).

Program module 118 takes care of object persistence. It reads objects from the object store, creates or changes them. To makes things faster it makes use of an object buffer. The object buffer can be cleared if certain objects are no longer needed.

Objects contain values for the characteristics of the corresponding object type according to configuration. In addition, a unique technical identifier is assigned to each object. Unlike the defining characteristics, the data format of the technical identifier is the same across all object types. It allows the business applications to refer to any object of any type uniformly—be it in program code or data store. Thus, it is not necessary to create an application specific database table for each configured object type, but the database schema can be fixed during development. Finally, an object contains administrative data that log when an object was created or changed.

At a later time, one or more application programs 113 may be started by the end-user. Each program sends a request to program module 120 indicating a role name. Program module 120 returns an object-selection user interface that is displayed by the output device 108. The end-user enters some selection criteria which are in turn sent to program module 118 for selection of the relevant objects. The objects are returned to application program 113 which in turn processes them. For each object, it reads the values of the predefined characteristics of the role which for example may specify what kind of calculations need to be performed. Then, it selects data from application-data store 123 by using the technical object identifier. After performing the calculations, the application program writes the calculated data to the application-data store using the technical object identifier.

Figure 3:
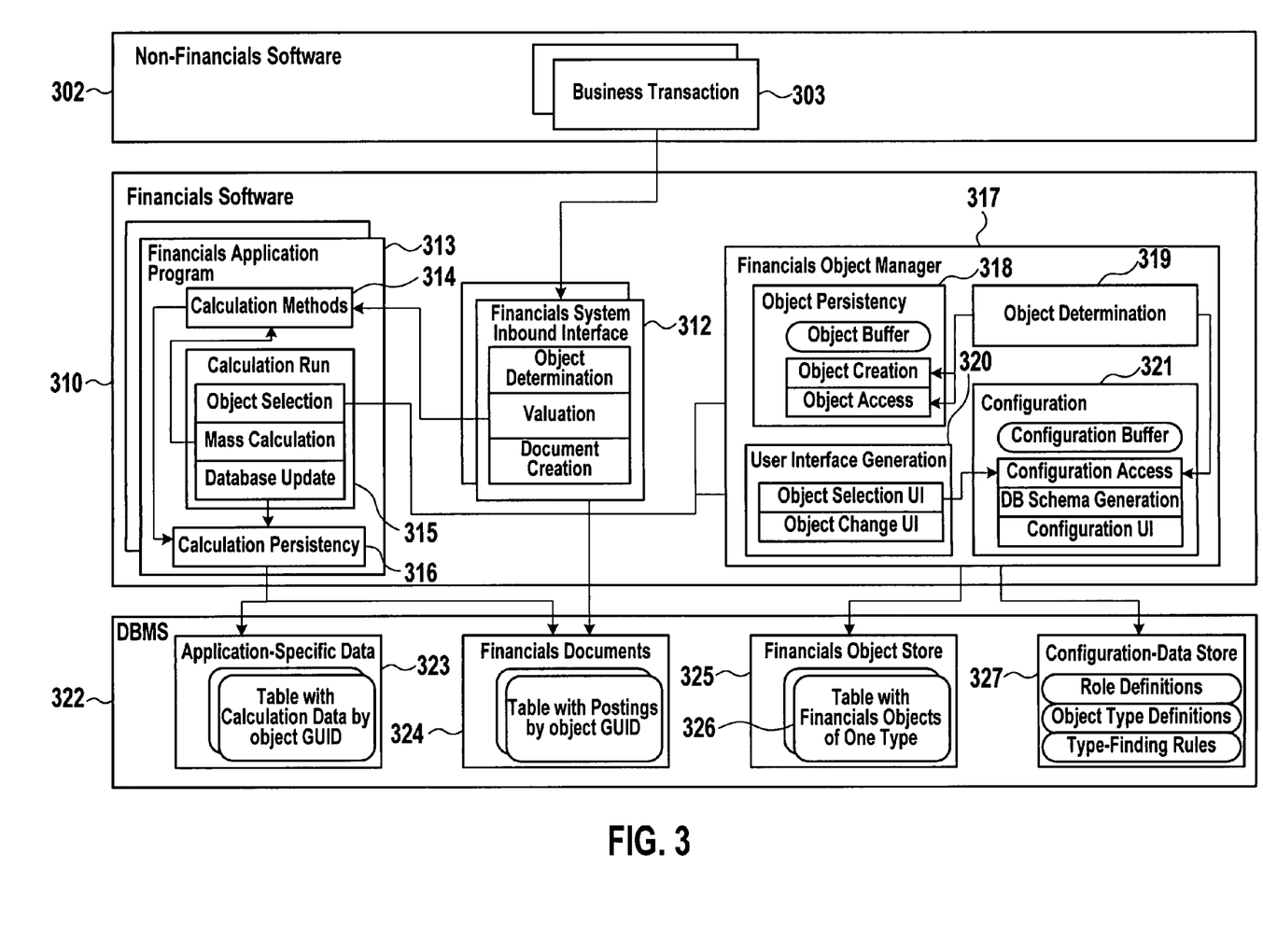
FIG. 3 illustrates an alternative, more detailed embodiment of the present invention as part of a financial system.

FIG. 3 illustrates, by way of example, the software components and database tables of an alternative, more detailed embodiment of the present invention, describing a case when it is used as part of a financial system. The embodiment of FIG. 3 constitutes a logical continuation of FIG. 1, where like elements are referenced by like reference numbers having added a value of 200.

The financial software 310 comprises a plurality of financial system inbound interfaces 312, a plurality of financial application programs 313, and a financial object manager 317. A plurality of business transactions 303 that are not part of the financial software send documents consisting of characteristics and key figures to the respective financial system inbound interfaces 312. A document represents an operational process that involves one or more business objects. For example, a raw material is taken from stock and used for a production order. A business object is identified by subsets of the document's characteristics.

Financial system inbound interface 312 validates the given document. For that purpose, first the financial objects, i.e., the financial abstractions of the business objects involved in the business transaction, are determined via program module 319. This process may be performed in accordance with the exemplary process of FIG. 2. Afterwards, calculation methods are performed by using program modules 314 of one or more financial application programs 313. They are passed the financial objects so that they know which calculation method to execute and so that they can access the data stores using the uniform technical object identifier. Finally, financial system inbound interface 312 creates a new financial document and writes it to database table 324. The financial document contains the technical identifiers of the concerned financial objects. It need not include the characteristics which are stored in financial object store 325.

The calculation methods of program module 314 calculate data based on aggregations of financial documents over financial objects and based on previously calculated data. Program module 316 encapsulates access to and from data stores 323 and 324 for calculation purposes. The financial objects serve as aggregation levels for which financial documents and calculation data can be summed up.

Certain calculations are too complex and need too much system resources to be performed for each set of data from a business transaction. Therefore, calculation run 315 of a financial application program 313 is started for a multitude of financial objects periodically. The calculation run requires certain controlling characteristics which are laid down by means of a role. The controlling characteristics indicate what kinds of calculations are to be performed.

When starting the calculation run, the end-user can specify the financial objects to be processed. Program module 315 sends a role name to user interface generation module 320. User interface generation module 320 requests all financial object types assigned to the role from program module 321 and returns a sub-screen displaying all relevant characteristics that can be used to restrict object selection. After the user has entered the selection criteria, the selection criteria are sent to program module 318 which in turn reads the objects from the relevant database tables 326.

All objects are uniformly identified by GUIDs (globally unique identifiers) and provide the characteristics specified by the role. Calculation run 315 starts the actual calculation for each object and passes the controlling characteristics to program module 314. Program module 314 executes the appropriate calculation method and returns the results. Then, program module 315 writes the results to one of the application-specific database tables of data store 323 and presents them to the end-user. The calculation data is updated per object GUID. The technical GUIDs are not suitable to identify the financial objects in the result list presented to the end-user. So, they are replaced by the more readable defining characteristics, using a service encapsulated in the financial object. Consequently, calculation run 315 need only know how to identify objects by GUIDs and roles, representing an abstract view on financial objects. It need not deal with the configured aspects of financial objects.

Financial object manager provides a single point of entry to all object-related issues. It releases the financial applications of having to know what kinds of objects exist and what the different interfaces are that provide the object data they need. Furthermore, it saves the applications the job of identifying the different types of objects on the user interface (object selection, results list, error log). The use of financial object manager allows faster development of the financial applications since the developer can concentrate on programming the actual calculation logic.

No matter what new object type comes into existence, the financial applications can be used for it without change of program code if only financial object manager learns of it via configuration. Furthermore, putting financial-object related information into one place simplifies customer enhancements and assures integration into all financial applications. If the end-user needs a new characteristic, they define it once for the relevant object types. The characteristic is then available wherever financial objects are used.

All parts of the financial applications that deal with objects work the same and look the same. The user interface is standardized.

Furthermore, separating financial objects from the underlying business objects of a business transaction allows to define a financial-specific view on business objects. First, financial objects may carry information that is not present in the corresponding business objects (e.g. Characteristics that control the mode of operation of a calculation run). We do not have to change the data model and user interface of the business object. Second, a financial object may aggregate several business objects, or there may be several financial objects that relate to one business object.

For example, the business object "product" is identified by a product number, while the end-user wants financial applications to process certain products on an aggregated level defined by product group. Consequently, the end-user configures an object type having the defining characteristic product group. Third, if some of the business objects are stored in another computer connected to the financial system via a network, storing all financial-relevant object information in a financial-specific database table allows financial applications to work independently of the availability of the network computer.

Figure 4:
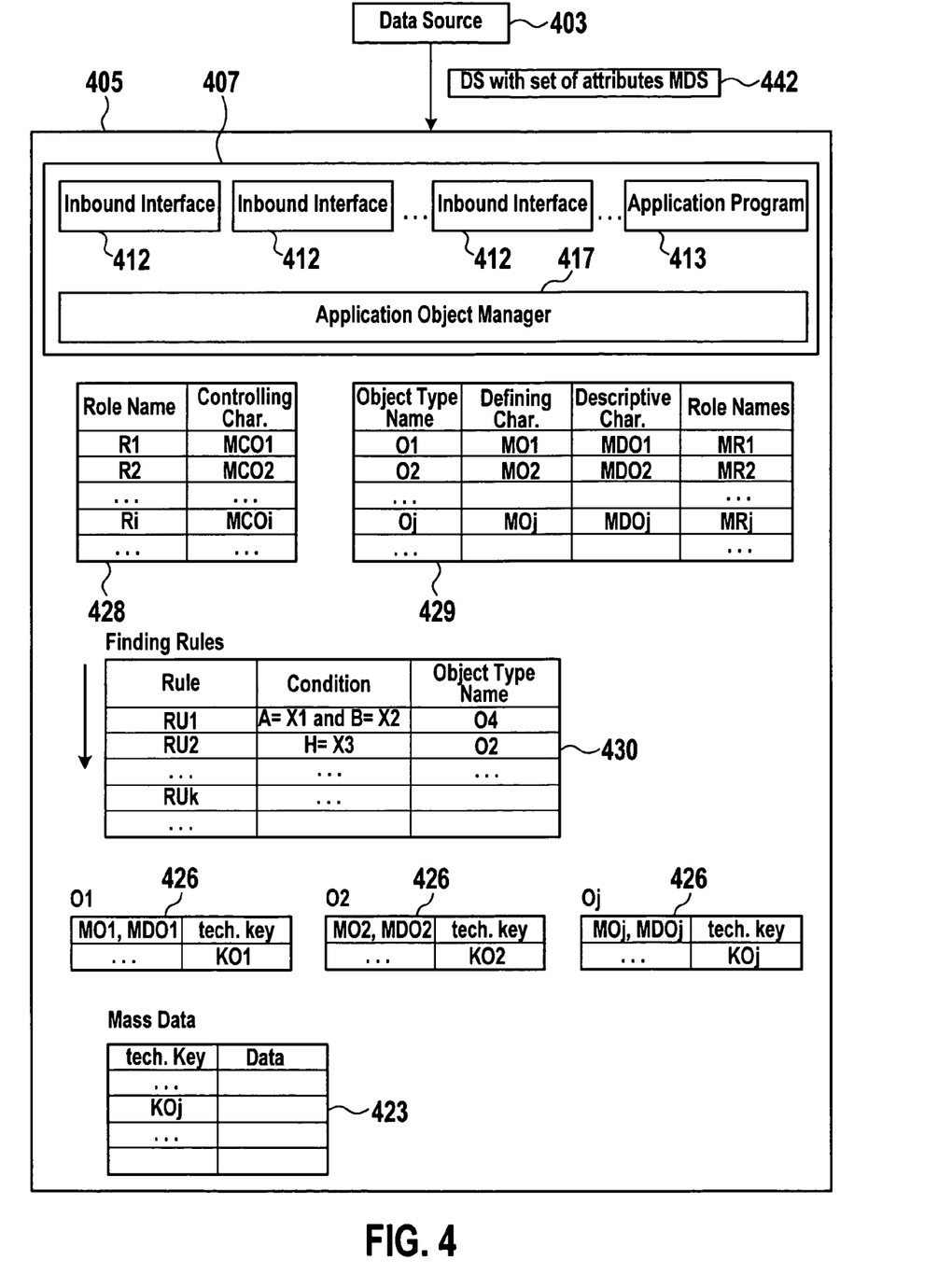
FIG. 4 shows another view of the exemplary computer system of FIG. 1, illustrating object type, role and object type finding rules definitions.

FIG. 4 shows a further embodiment of the exemplary computer systems of FIGS. 1 and 3. Elements of the embodiment of FIG. 4 that correspond to elements of the embodiments of FIGS. 1 and 3 are designated by like reference numerals.

Like in the embodiment of FIGS. 1 and 3, inbound interfaces 412 serve as receivers for data set DS 442 delivered by data source 403. Each of the inbound interfaces 412 includes a pre-programmed logic to determine the role of a received data set DS 442. Depending on the application an inbound interface 412 can also comprise pre-programmed logic in order to split the received data set DS 442 into sub-sets and to determine a role for each of the sub-sets. When data set DS 442 is split into sub-sets the set of attributes MDS that is contained in data set DS 442 is split into corresponding sub-sets of attributes.

Each one of the inbound interfaces 412 is programmed to forward a received data set DS 442 with its set of attributes MDS and the determined role name of the data set DS 442 to application object manager program 417 that is executed by CPU 407. If a split of the received data set DS 442 occurs the respective inbound interface 412 is programmed to forward the resultant sub-sets of the data set DS 442 together with the respective role names to application object manager program 417.

Object type definitions 429 are stored in tabular form in the example considered here. For example the set of defining characteristics MOj of object type definition Oj has a number of attribute or field names that constitute the defining characteristics of the object type definition Oj. Likewise, the set of descriptive characteristics MDOj is given by listing respective attribute or field names. In addition, an object type definition Oj contains a set of role names MRj.

Role definitions 428 are also stored in tabular form. In the example considered here a role definition for a role Ri is given by its set of characteristics MCOi. Like for the object type definitions the set of characteristics MCOi for defining a role RI is given by a list of attribute or field names using the same attribute or field name naming convention as for the object type definitions 429. In the embodiment considered here, the characteristics MCOi are controlling characteristics. However, it is possible that additional descriptive characteristics can also be given in a role definition.

Object type finding rules 430 are also stored in tabular form. The object type finding rule RUk is given by a condition statement and an object type name. The condition is expressed in terms of attribute or field names in accordance with the attribute or field name naming convention used for the role definitions 428 and the object type definitions 429. When the condition of RUk is fulfilled the object type name given in the object type finding rule of RUk is returned.

For example, object type finding rule RU1 has the condition "if value of field A of DS equals value X1 and value of field B of DS equals value X2"; if the condition is fulfilled by the current DS 442 then object type name O2 is returned. Likewise, rule RU2 has condition "if value of field H of DS equals value X3"; if the condition is fulfilled object type name O2 is returned.

A dedicated table 426 is stored for each object type Oj. Each table has entries for the sets of defining characteristics and descriptive characteristics of the specific object type. When a corresponding object has been instantiated a unique identifier is generated and stored as a technical key for the respective instantiated object.

Assuming that object type O1 has been instantiated the respective table 426 holds values for the set of defining characteristics MO1 and the set of descriptive characteristics MOD1. In addition a technical key KO1 is stored in the table 426 of the instantiated object type O1. The same applies analogously to other object types and instances of such object types as illustrated in FIG. 4.

Mass data referring to instantiated object types are stored in table 423. The mass data is stored in table 423 using the technical keys stored in tables 426. Hence, mass data stored in table 423 refers to specific objects, i.e. instances of object types, by means of the technical keys. For example, mass data stored in table 423 that has technical key KOj is assigned to the instantiated object type Oj having the same technical key KOj.

Processor 407 runs the inbound interfaces 412, application object manager program 417 as well as application program 413. Alternatively, the inbound interfaces 412, application object manager program 417 and/or application program 413 are executed by different processors of the same or another computer.

In operation, computer 405 receives data set DS 442 with a set of attributes or field names MDS using the same naming convention as for the object type, role and object type finding rule definitions. In addition, data set 442 contains values for the attribute or field names of the set MDS.

Data source 403 sends data set DS 442 to one of the inbound interfaces 412. The one of the inbound interfaces 412 that receives the data set DS 442 determines the role name of the data set DS 442 by means of its pre-programmed logic. The one of the inbound interfaces 412 forwards the data set DS 442 together with the role name to application object manager program 417.

Alternatively, the one of the inbound interfaces 412 splits data set DS 442 into sub-sets and forwards the sub-sets with their respective role names to application object manager program 417. In the following, it is assumed without restriction of generality that a split of the received data set DS 442 does not occur in the receiver, i.e., the one of the inbound interfaces 412.

Next, application object manager 417 uses table 429 in order to determine a set SO of object types containing the received role name in their object type definitions. In other words, each object type of the set SO fulfils the condition that it contains the received role name in its set of role names MRj.

Next, application object manager program 417 determines which ones of the object types contained in set SO match the data set DS 442 in order to determine a sub-set MSO of set SO. Each object type contained in sub-set MSO satisfies the condition that the complete set of its defining characteristics occurs in the received data set DS 442. In other words, the received data set DS 442 has all attributes or field names in its set MDS that also occur in the set of defining characteristics of the respective object type definition. The resultant sub-set MSO constitutes the candidate object types for the received data set DS 442.

In order to select one of the object types contained in the set MSO of candidate object types, those of the object type finding rules 430 which are assigned to an object type contained in MSO are applied in the order of priority, i.e., starting with the first rule RUk that is assigned to any one of the object types in MSO and proceeding in the order of priority until one of the rules returns an object type name Ol that is contained in the set of object types MSO.

Next, it is determined whether an instance of the identified object type Ol whose values of the defining characteristics are equal to the values of the corresponding attributes contained in DS 442 has already been stored in table 426 created for object type Ol. If this is the case the corresponding instance of the object type is returned to inbound interface 412 or application program 413. If this is not the case an instance of the object type Ol is created and a technical key is generated for storage of the instance in the respective table 426.

Figure 5:
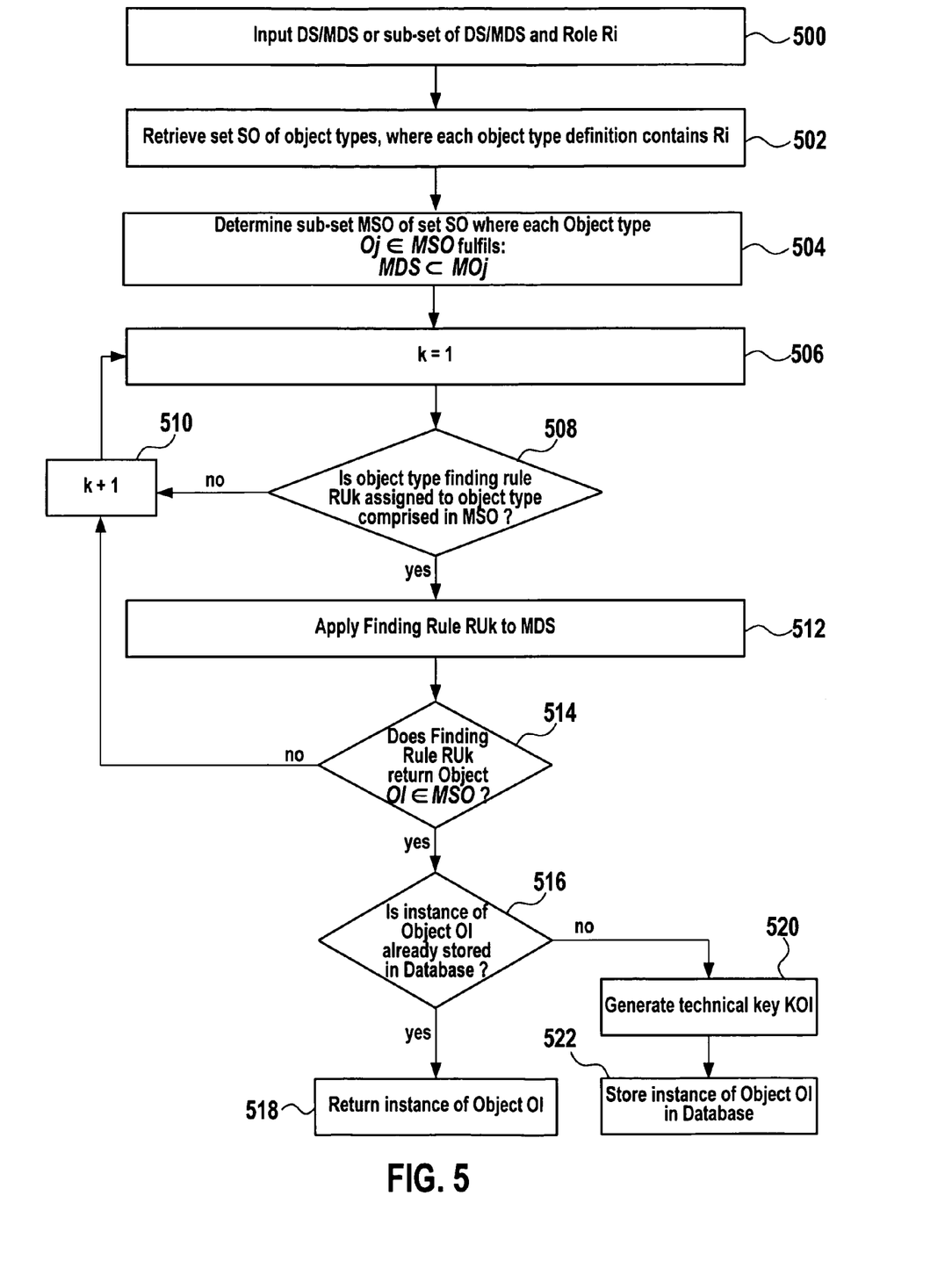
FIG. 5 is a flowchart describing an exemplary storage process of a data set using the definitions of FIG. 4.

FIG. 5 shows, by way of example, a flowchart of an exemplary process, consistent with an embodiment of the invention. In step 500, data set DS with its set of attributes MDS and its associated role Ri is received by the application object manager program from one of the inbound interfaces addressed by the data source. Alternatively, the application object manager receives a sub-set of the data set DS and a respective sub-set of the set of attributes MDS with the role name Ri associated with the sub-set. In the following, the case where the application object manager receives the complete set DS is considered without restriction of generality.

In step 502, the set SO of object types is retrieved from the respective database table (cf. table 429 of FIG. 4). Each object type Oj contained in the set SO fulfils the condition that its set of role names MRj contains the received role name Ri.

In step 504, the sub-set MSO of candidate object types is determined from the set SO. Each object type Oj contained in the sub-set MSO fulfils the condition that its set of defining characteristics MOj is a sub-set of the set of attributes MDS contained in the data set DS.

In step 506, the index k is initialized. In step 508, it is determined whether the highest priority object type finding rule RUk has an assigned object type that is contained in the sub-set MSO of candidate object types. If this is not the case, execution of the rule RUk by definition cannot return an object type contained in MSO such that the application of that rule is skipped by incrementing the index k in step 510 and returning to step 508.

If the contrary is the case, the control goes to step 512 for application of the object type finding rule RUk to the attribute values contained in the data set DS. In step 514, it is determined whether application of object type finding rule RUk returns an object type Oj=l that is contained in the sub-set MSO. If this is not the case, the index k is incremented (step 510) and the control goes back to step 508. If the contrary is the case, the control goes to step 516. In step 516, it is determined whether an instance of the selected object type Ol is already stored in the database. If this is the case, the instance of the object type Ol is returned in step 518.

If the contrary is the case, the technical key KOl is generated for the instance of object type Ol and the instance is generated and stored using the technical key KOl (steps 520, 522). Additional data processing operations may be required in order to provide values for all compulsory fields for instantiating the object of the determined object type.

Figure 6:
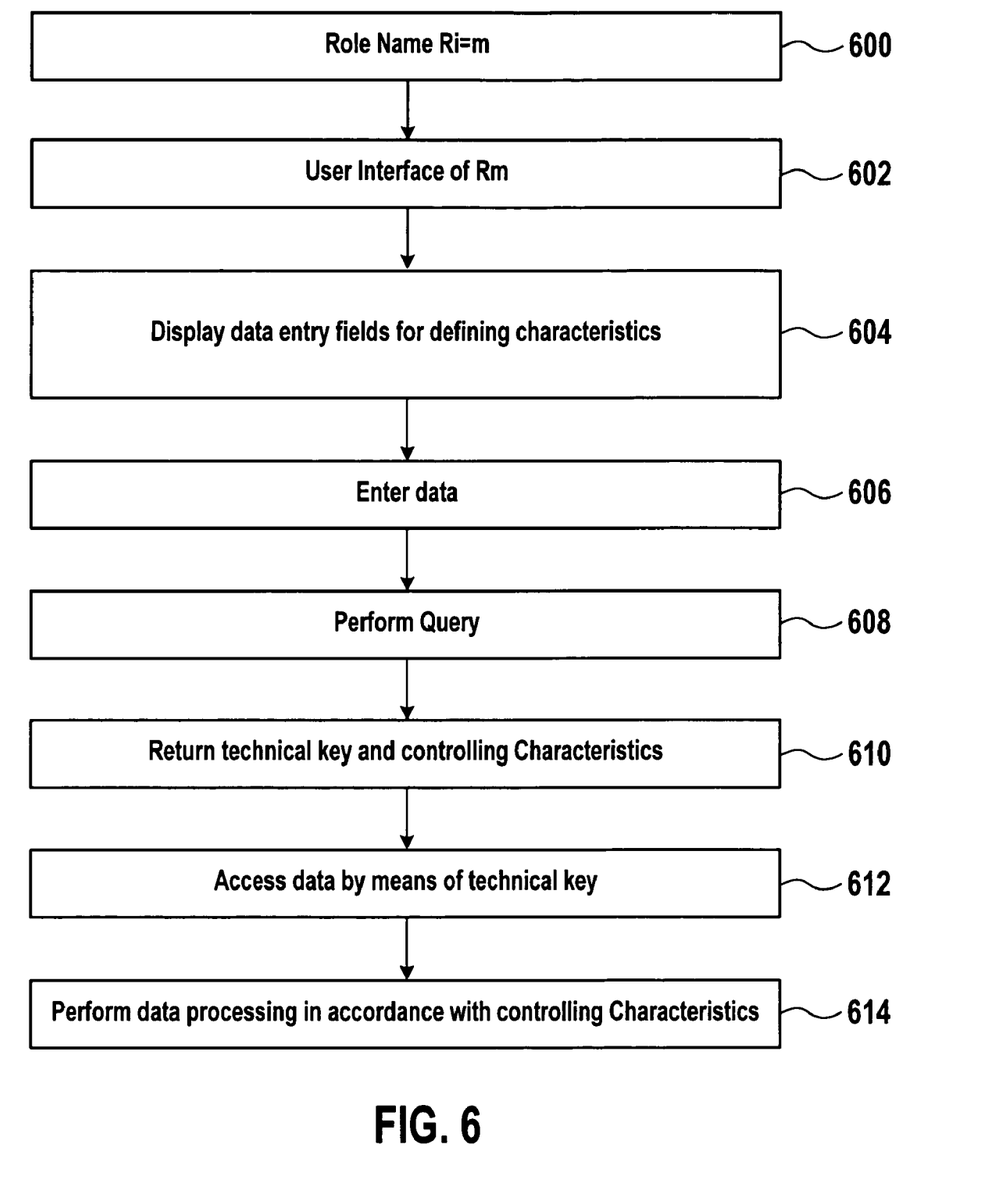
FIG. 6 is a flowchart describing an exemplary data retrieval process by an application program.

FIG. 6 shows an exemplary procedure for retrieving data from the database which is thus created. In step 600, the role name Rm is entered by, for example, application program 413 (cf. FIG. 4). In response, a role specific user interface for the selected role Rm is provided to the application program in step 602. This results in display of data entry fields for entering ranges or values for defining object characteristics (step 604).

The role Rm is typically contained in multiple sets of role names MRi of the object type definitions. The user interface for role Rm may include a data entry field for each defining characteristic of the sets of defining characteristics MOj of the object type definitions containing role name Rm in their sets of role names MRj.

In step 606, data is entered into the data entry fields via the user interface of Rm. This way, the user specifies ranges or values for filtering out instances of the object types that are of interest. In step 608, the corresponding database query is performed and in step 610 the technical keys of the retrieved objects are returned together with the values of the characteristics of role Rm. By means of the technical keys, the application program can access further data referring the retrieved objects (step 612). Data processing of the data that is retrieved from the database by means of the technical keys is performed by using the controlling characteristics MCOm returned in step 610 as values of the characteristics of role Rm (step 614).

While specific embodiments of the invention have been described herein, it will be appreciated that the invention may be practiced otherwise than as described. Furthermore, the description is not intended to limit the invention. For example, the order of steps to be performed to implement methods consistent with the present invention is not limited to the order described herein or prescribed in the claims.

Other embodiments of the invention will be apparent to those skilled in the art from consideration of the specification and practice of embodiments of the invention disclosed herein. It is intended, therefore, that the specification and examples be considered as exemplary only, with a true scope and spirit of the invention being indicated by the following claims.

What is claimed is:

1. A computer system for processing a set of data obtained from a data source, the set of data comprising a set of attribute or field names and respective attribute or field values, the computer system comprising:
    a configuration-data storage unit storing:
    object type definitions, each object type definition comprising an object type name, a set of defining characteristics, and a set of role names;
    role definitions, each role definition comprising a role name and a set of controlling characteristics; and
    a list of prioritized finding rules, each finding rule comprising a condition for application to values of the set of data and one of the object type names that is returned when the condition is fulfilled;
    an object storage unit storing objects that are instances of the object type definitions;
    a data storage unit storing mass data referring to objects;
    a set of inbound interfaces; and
    a processor that receives the set of data and one of the role names from one of the interfaces,
    determines a set of object types, wherein each object type of the set contains the one of the role names in its object type definition,
    determines a set of candidate object types as a sub-set of the set object types, wherein the defining characteristics of each object type contained in the set of candidate object types are contained as a sub-set in the attribute or filed names of the set of data,
    applies the finding rules in order of priority in order to find one of the candidate object types, and
    queries the object storage unit to determine if the found object type has already been instantiated for values of the defining characteristics given in the set of data, and if so, return the corresponding instance of the found object type, and if not, generate a unique identifier and an instance of the found object type, and store the instance of the object type.

2. The computer system of claim 1, further comprising a buffering unit to buffer object-type definitions, role definitions, and type-finding rules used by the processor.

3. The computer system of claim 1, further comprising a buffering unit to buffer instances of object types.

4. The computer system of claim 1, further comprising:
    a receiver to receive one of the role names from an application program;
    a set of role specific user interfaces, each user interface having a set of data entry fields for specifying the characteristics of object types having assigned the role received from the application program; and
    a querying unit to query the object storage unit on the basis of data that has been entered into the data entry fields and return an instance of the object types matching the query, with the instance of the object types containing the unique identifier and the characteristics of the given role.

5. The computer system of claim 1, wherein the object storage unit comprises a database table for each object type definition and one or more database tables for storing application-specific mass data referring to instantiated object types.

6. A method for processing sets of data obtained from a data source, the set of data comprising a set of attribute or field names and respective attribute or field values, the method comprising:
    storing object type definitions, each object type definition comprising an object type name and at least a set of defining characteristics and a set of role names;
    storing role definitions, each role definition comprising a role name and at least a set of controlling characteristics;
    storing a list of prioritized finding rules, each finding rule comprising a condition for application to values of the set of data and one of the object type names that is returned when the condition is fulfilled;
    storing objects that are instances of the object type definitions;
    storing mass data referring to objects;
    receiving the set of data and one of the role names from an inbound interface;
    determining a set of object types, wherein each object type of the set contains the one of the role names in its object type definition;
    determining a set of candidate object types as a sub-set of the set object types, wherein the defining characteristics of each object type contained in the set of candidate object types are contained as a sub-set in the attribute or filed names of the set of data;
    applying the finding rules in order of priority in order to find one of the candidate object types; and
    querying a storage unit that stores the instances of the object types to determine if the found object type has already been instantiated for values of the defining characteristics given in the set of data, and if so, returning the corresponding instance of the found object type, and if not, generating a unique identifier and an instance of the found object type, and storing the instance of the object type.

7. The method of claim 6, further comprising buffering object-type definitions, role definitions, and type-finding rules.

8. The method of claim 6, further comprising buffering instances of object types.

9. The method of claim 6, further comprising:
    receiving one of the role names from an application program;
    entering of data into data entry fields of a user interface being specific to the one of the role names;
    querying the storage unit storing the instances of the object types on the basis of data that has been entered into the data entry fields; and
    returning an instance matching the query, with the instance containing the unique identifier and characteristics of a given role.

10. A computer readable medium storing a program for causing computer system to execute a method for processing a set of data, the computer system comprising:

a configuration-data storage unit storing:

object type definitions, each object type definition comprising an object type name, a set of defining characteristics, and a set of role names;

role definitions, each role definition comprising a role name and a set of controlling characteristics; and a list of prioritized finding rules, each finding rule comprising a condition for application to values of the set of data and one of the object type names that is returned when the condition is fulfilled;

an object storage unit storing objects that are instances of the object type definitions;

a data storage unit storing mass data referring to objects;

a set of inbound interfaces; and a processor to execute the method;

the method comprising :

receiving the set of data and one of the role names via one of the inbound interfaces;

determining a set of object types, where each object type of the set contains the one of the role names in its object type definition;

determining a set of candidate object types as a sub-set of the set of object types, where the defining characteristics of each object type contained in the set of candidate object types are contained as a sub-set in the attribute or filed names of the set of data;

applying the finding rules in order of priority in order to find one of the candidate object types; and querying the object storage unit to determine if the found object type has already been instantiated for values of the defining characteristics given in the set of data, and if so, return the corresponding instance of the found object type, and if not, generate a unique identifier and an instance of the found object type, and storing the instance of the found object type.

11. The computer readable medium of claim 10, wherein the method further comprises processing object-type definitions, role definitions and type-finding rules.

12. The computer readable medium of claim 10, wherein the method further comprises buffering instances of object types.

13. The computer readable medium of claim 10, wherein the computer system further comprises a set of role specific user interfaces, each user interface comprising a set of data entry fields for specifying the characteristics of object types having assigned the role received from the application program, and wherein the method further comprises:

receiving one of the role names from an application program;

entering of data into data entry fields of the user interface being specific to the one of the role names;

querying the object storage unit on the basis of data that has been entered into the data entry fields; and returning an instance matching the query, with the instance containing the unique identifier and the characteristics of the given role.

* * * * *